United States Patent [19]

Alsenz

[11] Patent Number: 4,825,662
[45] Date of Patent: * May 2, 1989

[54] TEMPERATURE RESPONSIVE COMPRESSOR PRESSURE CONTROL APPARATUS AND METHOD

[76] Inventor: Richard H. Alsenz, 1545 Industrial Rd., Missouri City, Tex. 77489

[*] Notice: The portion of the term of this patent subsequent to Sep. 23, 2003 has been disclaimed.

[21] Appl. No.: 62,390

[22] Filed: Jun. 15, 1987

Related U.S. Application Data

[63] Continuation of Ser. No. 819,387, Jan. 16, 1986, abandoned, which is a continuation-in-part of Ser. No. 706,403, Feb. 27, 1985, Pat. No. 4,628,700, which is a continuation of Ser. No. 458,914, Jan. 18, 1983, abandoned, which is a continuation-in-part of Ser. No. 257,113, Apr. 24, 1981, Pat. No. 4,612,776, which is a continuation of Ser. No. 62,525, Jul. 31, 1979, abandoned.

[51] Int. Cl.$^4$ .............................................. F25B 5/00
[52] U.S. Cl. ....................................... 62/117; 62/175; 417/7
[58] Field of Search .............. 62/175, 117; 236/1 EA, 236/1 ER; 307/39; 165/26; 417/7

[56] References Cited

U.S. PATENT DOCUMENTS

| | | | |
|---|---|---|---|
| 2,286,538 | 6/1942 | Guler | 417/7 X |
| 2,461,760 | 2/1949 | Newton | 62/4 |
| 3,003,333 | 6/1958 | Lysen | 62/199 |
| 3,294,023 | 12/1966 | Martin-Vegue, Jr. et al. | 417/7 |
| 3,513,662 | 11/1968 | Golber | 62/115 |
| 3,586,869 | 6/1971 | Kompelien | 236/1 ER |
| 3,616,846 | 11/1971 | Wills | 165/20 |
| 3,717,300 | 2/1973 | Evalds | 236/1 EA |
| 4,084,388 | 4/1978 | Nelson | 62/152 |
| 4,132,086 | 1/1979 | Kountz | 62/209 |
| 4,152,902 | 5/1979 | Lush | 62/157 |
| 4,384,462 | 5/1983 | Overman | 62/175 |
| 4,439,997 | 4/1984 | Cantley | 62/175 |
| 4,612,776 | 9/1986 | Alsenz | 62/175 |

Primary Examiner—William E. Wayner

[57] ABSTRACT

A control system for controlling a closed-loop refrigeration system having multiple parallel commonly piped compressors is disclosed. Various combinations of compressors define the compressor capacity stages of the system. The disclosed control system responds to a system parameter, such as the suction line pressure or the temperature of an area to be cooled by an evaporator of the refrigeration system, to control the selection of the minimum system compressor capacity necessary to maintain the temperature of the area to be cooled to the lowest temperature. Control of the compressor capacity is effected by the sensed system parameter by generating an operating range defined from an upper to a lower operating limit. Operations above or below this range determines whether an increase or decrease, respectively, in compressor capacity needs to be made. Additional control circuits are included to sense the difference between the sensed parameter and a desired setting to effect a shifting in the control operating range to obtain the minimum values for the operating limits which will accomplish the desired control function.

11 Claims, 3 Drawing Sheets

TEMPERATURE RESPONSIVE COMPRESSOR PRESSURE CONTROL APPARATUS AND METHOD

This application is a continuation of application Ser. No. 819,387, filed Jan. 16, 1986, now abandoned, which is a continuation-in-part application of application Ser. No. 706,403, filed Feb. 27, 1985, now U.S. Pat. No. 4,628,700, which is a continuation of application Ser. No. 458,914, filed Jan. 18, 1983, now abandoned, which is a continuation-in-part of application Ser. No. 257,113, filed Apr. 24, 1981, now issued as U.S. Pat. No. 4,612,776, which is a continuation of application Ser. No. 062,525, filed July 31, 1979, now abandoned. Each of the applications referred to herein were filed by the same applicant as in the present application.

BACKGROUND OF THE INVENTION

1. Field Of The Invention

This invention relates to increasing the efficiency of cooling or refrigeration systems, especially for those systems employing commonly-piped evaporator coils where at least one set of coils is located for temperature controlling one compartmentalized or non-compartmentalized area and another set of coils is located for temperature controlling another compartmentalized or non-compartmentalized area.

2. Background Of The Invention

Cooling systems generally comprise a condenser coil, a receiving vessel for the condensed liquid from the condenser coil, an expansion valve, an evaporator coil, and a compressor. The compressor is connected to the condenser coil. In addition, such a cooling system includes a defrost mechanism for the evaporator coil since the moisture that tends to accumulate thereon turns to ice during operation and would, in time, build up to a degree that would make the cooling system almost totally inefficient, if not inoperable.

Improvements over the simplest cooling system briefly described above have included using multiple compressors, rather than only one, and alternating their use in accordance with demand so as to use only enough compressor capacity sufficient for the demand and so as to minimize wear on the compressors. Such an energy efficient system is shown and described in co-pending U.S. Pat. No. 4,612,776, by the same inventor as the present application. The system of 4,612,776 represents a technique for achieving more efficient operation through the use of a single highest fixed "cut in" and a single highest fixed "cut out" operating suction line pressure while insuring adequate temperatures in the refrigerated spaces served by the refrigeration system.

In the past, the cycling of stages of a multiple-stage refrigeration or cooling system has been principally accomplished by setting each stage at a successively lower "cut in" and "cut out" pressure of the refrigerating fluid flowing in the suction line from the evaporator coil to the compressor(s) or cooling stages. The use of successively lower "cut in" and "cut out" pressure ranges for each cooling stage results in an average pressure which is lower than the mean pressure of the pressure differential between the "cut in" and "cut out" pressures of the highest stage. Various mechanical and electromechanical systems have been devised to attempt to solve this problem, primarily utilizing the successively lower pressure ranges for each successive cooling stage as described below.

The invention of 4,612,776 briefly stated, involves an apparatus and method of controlling the capacity of a multiple compressor refrigeration system. The invention first establishes a selected cooling stage "cut-in" and "cut-out" suction line pressure for the system. Secondly, the system determines when the suction line pressure is equal to either of these pressures, and based on this determination, controls the selection of the appropriate capacity for the system to achieve an average operating suction line pressure between the selected single highest "cut-in" and single highest "cut-out" pressures.

It is not unusual for the same compressor (or system of compressors) to be commonly piped in a cooling system which employs more than one evaporator coil. The reason for this is that the capacity of the system is sufficiently designed for cooling a given overall area; however, some of this area is compartmentalized separately from the rest of this area. Moreover, it is commonly desirable to reduce the temperature in one area to a lower temperature than is required for another. By example then, if one area is smaller in size than another and both are cooled in the same manner by similar evaporator coils, then the smaller area will be cooled at a lower temperature than the larger of the areas.

Rather than have two completely different systems when there are two or more separate areas to cool, such systems having duplicate compressors, duplicate condenser coils, duplicate condenser fluid vessels, and the like, it is less expensive to have one system with these common components commonly-piped, usually in parallel rather than in-line, with separate evaporator coils only. Although separate coils are commonly employed in respective separate compartments, it is also usual for separate coils to be used for a common large area, where one coil is used, for example, in one room and another coil is used in a second room, one room being kept at a lower temperature than the other.

It is also known that compressors can be operated to raise the pressure in a cooling system to warm the area cooled by an evaporator coil as well as to the lower the pressure to cool the area cooled by an evaporator coil. The system to be described hereinafter includes this capability.

Therefore, it is an object of the present invention to provide an improvement for optimizing the pressure control of a cooling system having at least two commonly-piped evaporated coils.

It is another object of the present invention to provide an improvement for providing pressure control to a cooling system wherein the further away from a norm temperature an area may be, e.g. a temperature set point, the more rapid will be the rate of adjustment of pressure.

SUMMARY OF THE INVENTION

The invention herein disclosed is an apparatus and method for controlling compressor operation of a cooling system having a plurality of commonly-piped evaporator coils. One of the coils, or the area cooled by one of the coils, desirably operates at a temperature level lower than the others. In a first embodiment, a controller circuit responds either to a pressure sensor which senses the suction line pressure, or to a temperature sensor which senses the temperature of the compartment to be maintained at the coldest temperature. The selected sensor output is used to sense operation of the refrigeration system, and the controller cicuit operates to select system compressor capacity to control the sensed temperature for the coldest compartment or the suction line pressure to operate in a desired range thereby to control the temperature of the compartment to be cooled to the lowest temperature.

In an alternate embodiment, a thermoelectric probe senses the temperature of the coldest compartment, and develops a voltage proportional thereto. A voltage reference means is adjustably set to have an output voltage which is equal to the voltage that the thermoelectric probe produces when the monitored coil or area is at the desired temperature.

The voltage outputs of the thermoelectric probe and the reference means are applied as inputs to an integrator, the output of which is connected to a pressure adjustment. When the integrator registers that the detected or sensed temperature is too cold, the setting is raised which raises the pressure in the cooling system and raises the temperature of the coldest area. When the integrator registers that the detected or sensed temperature is too warm, on the other hand, the pressure adjustment is lowered thereby lowering the pressure in the cooling system and, hence, lowering the temperature.

When the coil or compartment being monitored is defrosted, a switch is operated to short the inputs of the integrator and thereby to effectively prevent the output from changing.

Because of the integrator, which is effectively a comparator with an RC time constant, the output therefrom integrates the difference in its inputs. In other words, the output will follow an integration curve and, therefore, accentuate large differences to quickly bring the monitored condition to the desirable temperature.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are therefore not to be considered limiting of its scope, for the invention may admit to other equally effective embodiments.

IN THE DRAWINGS

Figure 1:
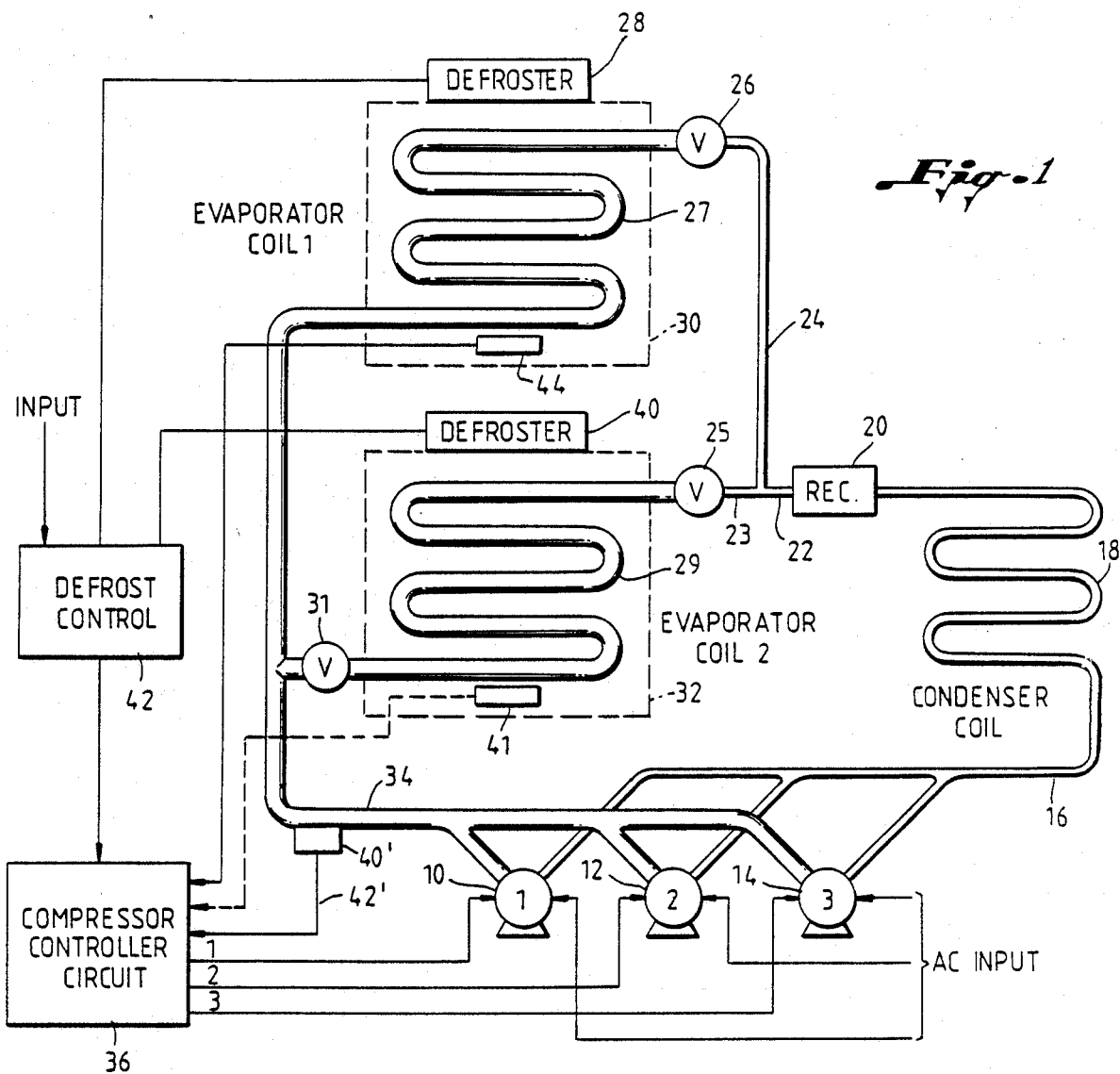
Figure 2:
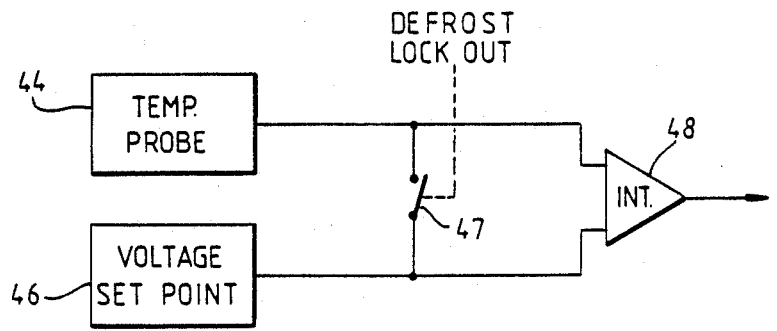
Figure 4:
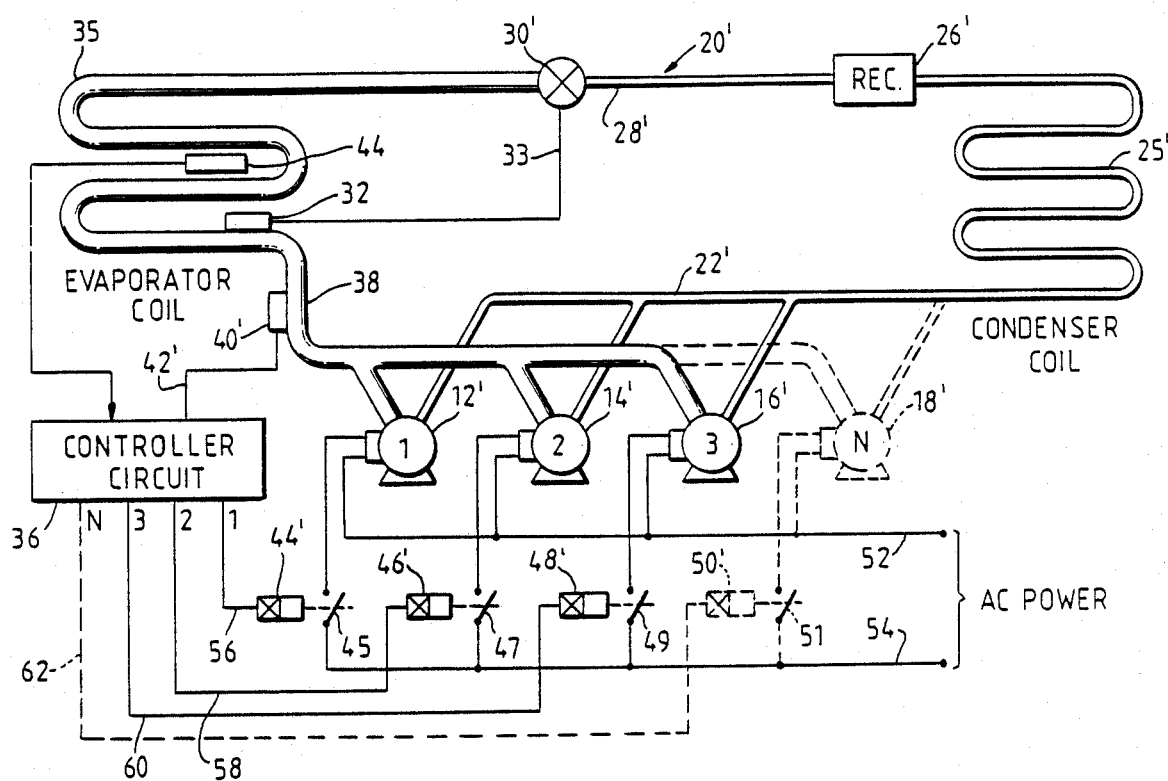
Figure 5:
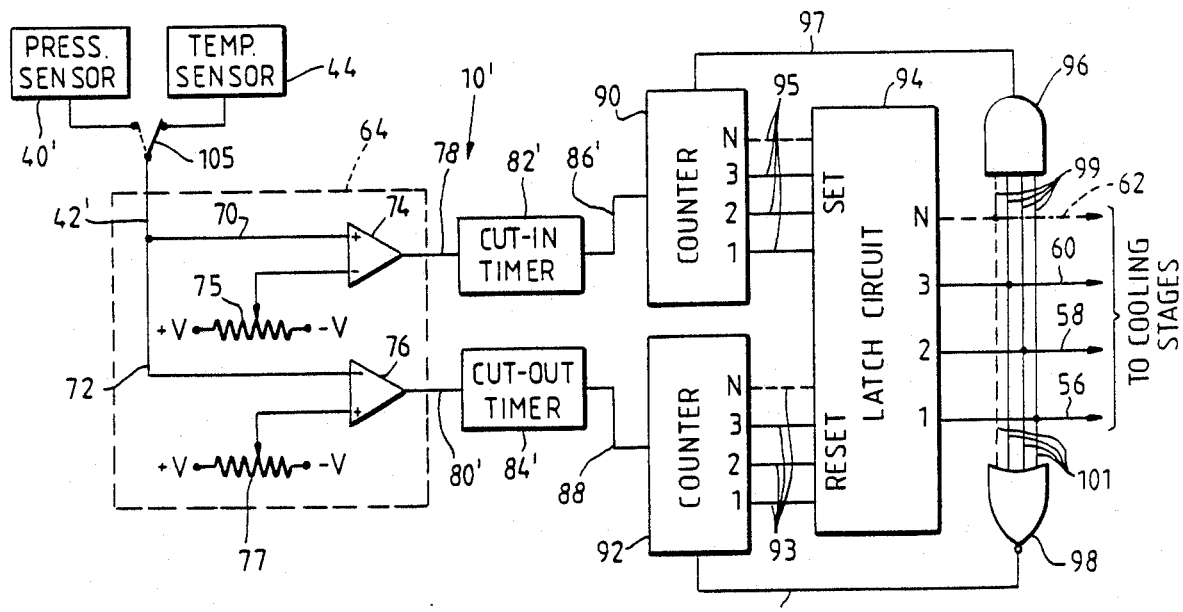
Figure 6:
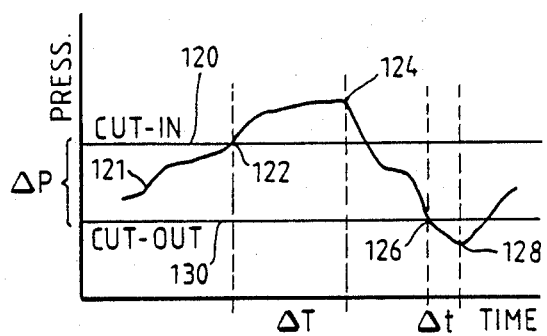
Figure 7:
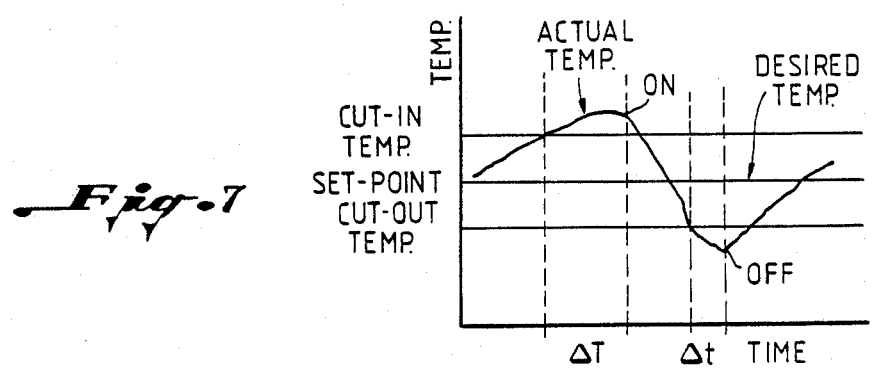
Figure 3:
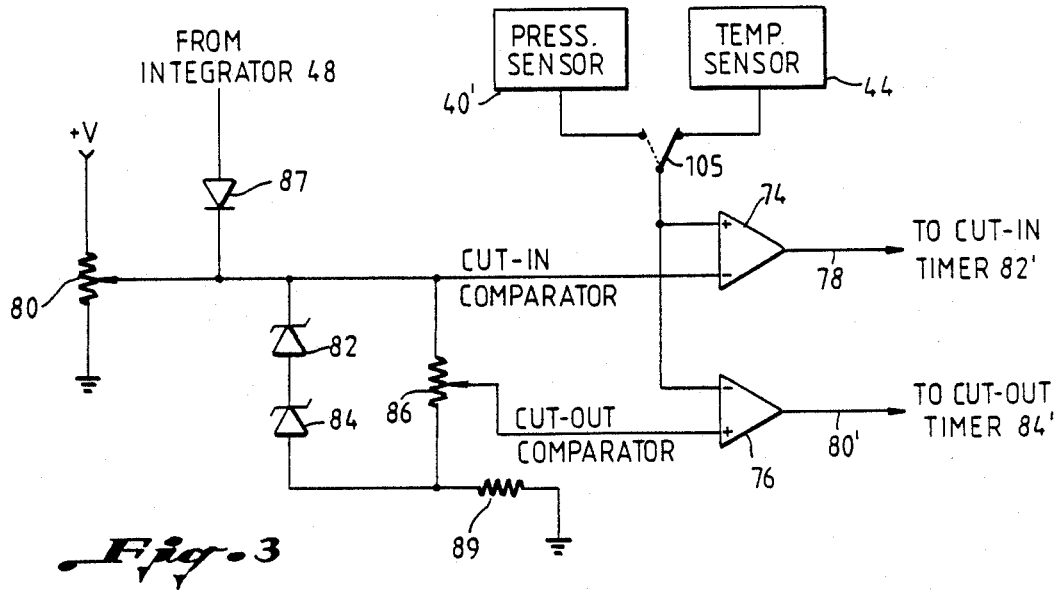

FIG. 1 is a simplified mechanical/electrical block and schematic diagram of a cooling system employing multiple compressors and multiple evaporator coils, all of which are controlled by a controlling apparatus in accordance with the present invention;

FIG. 2 is a block diagram of a portion of the electrical circuits of the controlling apparatus show in FIG. 1;

FIG. 3 is a simplified schematic diagram of a portion of the controller apparatus shown in FIG. 1 which generates pressure cut-in and cut-out comparator control signals;

FIG. 4 is a simplified mechanical/electrical block and schematic diagram of a cooling system employing multiple compressors which are controlled by controlling apparatus accordance with the present invention to control the cooling from a single evaporator coil;

FIG. 5 is a simplified block diagram of the embodiment of a control circuit responsive to either the suction line pressure or the temperature of an area cooled by the refrigeration system, for controlling the selection of compressors and thereby controlling the suction line pressure, of the cooling system shown in FIG. 4;

FIG. 6 is a graphical representation of the refrigerating fluid suction line pressure versus time for a multiple-stage refrigeration or cooling system operating within the parameters of the capacity control method and apparatus according to the present invention; and FIG. 7 is a graphical representation of the temperature of the coldest compartment to be cooled versus time for a multiple-stage refrigeration or cooling system operating within the parameters of the capacity control method and apparatus according to the present invention.

DESCRIPTION OF THE PREFERRED EMBODIMENT

Referring first to FIG. 4, the refrigeration system capacity controller circuit 36 is shown disposed in a multiple-stage refrigeration or cooling system 20' consisting of a plurality of parallel staged refrigerant compressors 12', 14', 16', and 18' for discharging compressed pressurized refrigerant vapor through discharge line 22' to a condenser coil 25' where the pressurized refrigerant vapor is condensed to a liquid and then delivered to a receiver vessel 26'. From the receiver 26', the liquid refrigerant flows through line 28' and through an expansion device or valve 30', typically a mechanical expansion valve responding to the temperature in suction line 38 as sensed by temperature sensing device 32. The temperature signal from sensor 32 is applied to valve 30' through conductor 33 to initiate the expansion valve action.

The liquid refrigerant is injected through expansion device 30' into the evaporator coil 35 when the liquid refrigerant, encountering the low pressure of the evaporator coil, boils and evaporates thus absorbing heat from the evaporator coil. The hot vaporized refrigerant from the evaporator coil is drawn through suction line 38 to the inlet ports of the multiple compressors 12'-18'. the number of parallel compressors to be staged in the system varies according to the refrigerating or cooling system load. In FIG. 4, three compressors are shown as 12', 14' and 16', and an "Nth" compressor represented in dotted lines by compressor 18'.

A pressure transducer 40' is attached to the suction line 38 and determines the refrigerant vapor pressure within suction line 38 and generates an electrical signal representative of the measured suction line pressure. A temperature probe 44 is associated with evaporator 35 to sense the temperature of a compartment to be cooled, i.e., the coldest compartment. The output from both pressure transducer 40' and temperature probe 44 are applied to a selector switch 105 which selects the output signal from either temperature probe 44 or pressure transducer 40' to control compressor capacity selection. The signal from switch 105 is applied through conductor 42' as an input to the capacity controller circuit 10', which will be hereinafter described in grater detail. The output of the controller circuit 36 is a plurality of outputs corresponding to the number of the plurality of cooling stages or parallel compressors staged in the system. Accordingly, there are a corresponding "N" number of outputs from the capacity controller circuit 36 labelled 1, 2, 3 and N.

The controller circuit output 1 is applied through conductor 56 to the coil of a relay 44' which controls relay switch contacts 45 for applying AC power via conductors 52 and 54 to the first compressor 12' for energizing the compressor when it is desired to cut the compressor into the system. Similarly, the 2, 3 and N outputs of the capacity controller circuit are applied through conductors 58, 60 and 62, respectively, to the coils of relays 46', 48' and 50' respectively, for successively closing switches 47', 49 and 51, respectively, for successively applying AC electrical power to the 2, 3 and N compressors, respectively, for either turning on or turning off the compressors in a staged sequence.

Referring now to FIGS. 4, 5, 6 and 7, the operation of the capacity controller circuit 36 will be described in greater detail. The following description describes the operations of the present invention when switch 105 has selected the output from suction line pressure sensor 40' as the signal which controls the selection of the system compressor capacity. However, the following description is equally applicable had switch 105 selected as the compressor capacity control signal the signal from temperature probe 44, which is sensing the temperature of the compartment to be cooled. For the case where the output from temperature probe 44 is selected by switch 105, the temperature cut-in and temperature cut-out control range illustrated in FIG. 7 would be applicable in the same way as FIG. 6 is applicable when switch 105 selects the output from pressure detector 40'. For such a situation, where the following description refers to a pressure, temperature should be substitute therefor.

The pressure detecting means or transducer 40' is sealingly inserted into the refrigerant vapor flow 65 in suction line tubing 38. Pressure transducer 40' may be any conventional pressure detecting means for generating an electrical signal representative of the pressure within line 38. The pressure signal from transducer 40' is applied through conductors 42' and 70 to the positive input of a comparator circuit 74, and through conductors 42' and 72 to the negative input of a second comparator circuit 76. To set a predetermined "cut-in" pressure for the system, a voltage potential is applied through a voltage varying means, such as a potentiometer 75, to the negative input of the comparator circuit 74. Similarly, a voltage is applied through a voltage varying means, such as a potentiometer 77, to the positive input of the comparator circuit 76 to set a predetermined "cut-out" pressure for the system. As will be pointed out below with respect to the cut-in and cut-out comparator control voltages generated in accordance with the present invention (See FIG. 3), the "cut-in" control voltage for the negative input of comparator 74 and the "cut-out" control voltage for the positive input of comparator 76 to control a multiple compressor, multiple evaporator coil cooling system could be generated in response to the temperature of the coldest compartment to be cooled thereby to dynamically achieve the highest suction line pressure operating condition while meeting the cooling requirements of the coldest compartment.

Comparator circuit 74 compares the predetermined cooling system "cut-in" pressure (set by potentiometer 75) against the suction line pressure continuously detected by pressure transducer 40' and produces a "cut-in" electrical signal when the measured pressure exceeds the predetermined "cut-in" pressure. Comparator circuit 76 compares the predetermined cooling system "cut-out" pressure (set by potentiometer 77) against the pressure continuously detected by the pressure transducer 40' and produces a "cut-out" electrical signal when the detected system pressure exceeds the predetermined "cut-out" pressure. The combination of transducer 40', potentiometers 75 and 77 for establishing system pressure "cut-in" or "cut-out" pressure levels and the comparators 74 and 76 also comprise detection means 64 for establishing a selected cooling stage "cut-in" or "cut-out" pressure and determining when those established pressures have been reached and providing an output signal in response thereto, i.e., output of comparators 74 or 76.

The "cut-in" signal of comparator 74 is applied through conductor 78 to a timer circuit 82' which generates an output electrical control signal after a first predetermined minimum time delay. The delayed time output control signal is applied through conductor 86' as an input to a counter 90. Counter 90 is a conventional counter circuit that generates a successive plurality of outputs 1 to N corresponding to the number of staged parallel compressors in the system. Each delayed control signal received from timer 82' by counter 90 will cause a counter output signal to appear at one of the series of successive counter outputs 1, 2, 3 or N in repetitive succession, and are applied via a conductor 95 as a "set" input to a latch circuit 94.

The latch circuit 94 is of a conventional solid state design and generates a series of repeatable successive "cut-in" electrical control signals at outputs 1, 2, 3 and N, to be applied through conductors 56, 58, 60 and 62, respectively, to a series of repeatable successive compressor control relays 44', 56', 48' and 50', respectively, in response to successive "set" input signals received via conductors 95 from the 1, 2, 3 or N outputs of counter 90. For example, if the counter 90 has an output signal at output 1 applied through a conductor 95 as a "set" input to latch circuit 94, latch circuit 94 will generate a control signal output voltage at its 1 output (conductor 56). Similarly, output signals from counter 90 appearing in a series successively at 2, 3 and N are applied through conductors 95 as repeatable successsive "set" inputs to latch circuit 94, thereby generating "cut-in" or turn on control signals appearing at outputs 2, 3 and N (conductors 58, 60, and 62, respectively). The electrical control signals are voltages applied through conductors 56, 58, 60 and 62, respectively to relays 44', 46', 58' and 50, respectively, as hereinabove described for successively energizing the relays 44', 46', 48' and 50', respectively, and successively energizing or turning on one of the multiple compressors 12', 14', 16' and 18', respectively.

Similarly, the "cut-in" output signal of comparator 76 is applied through connector 80' to a timer 84'. Timer circuit 84' generates a delayed "cut-out" electrical control signal after a predetermined time delay. The control signal is applied through conductor 88 as an input to another counter circuit 92. Counter 92 may be identical to the counter 90 hereinabove described. Each successive delayed "cut-out" control signal received from timer circuit 84' generates one of a series of repeatable successive electrical signals at counter 92 outputs 1, 2, 3 and N, which are applied through conductors 93 as "reset" inputs to latch circuit 94. Receipt of the successive series of delayed "cut-out" control signals from counter 92 causes the latch circuit 94 to be reset in the succession in which the counter signals are received.

For example, upon receipt of a counter 92 output 1 signal applied through conductor 93 as a "reset" input to latch circuit 94, the latch 94 output at 1 will be reset and no voltage will appear on conductor 56 thus de-energizing relay 44', opening relay switch contacts 45 and "cutting-out" the first compressor 12' which has run the longest. Accordingly, successive counter 92 signals received from outputs 2, 3 and N as "reset" inputs to latch circuit 94 will successively reset the latch circuit and remove the latch circuit voltage outputs appearing at lines 2, 3 and N (conductors 58, 60 and 62, respectively), for "cutting-out" compressors 14', 16' and 18' in succession.

In addition, the latch circuit outputs 1, 2, 3 and N (conductors 56, 58, 60 and 62, respectively) are also connected by conductors 99 as inputs to a conventional AND gate 96. When all of the latch circuit outputs 1, 2, 3 and N have positive output voltages appearing thereon, the AND gate 96 generates an output signal applied through conductor 97 to counter 90 to disable counter 90 at its last count and prevent further delayed "cut-in" electrical signals received from timer 82' from generating further counter 90 output electrical signals for application to the latch circuit 94. Similarly, the latch circuit outputs 1, 2, 3, and N are also connected by means of conductors 101 as inputs to a conventional NOR gate 98. NOR gate 98 will generate an electrical output signal to be applied through conductor 103 to disable counter 92 when all of the latch circuit outputs 1, 2, 3 and N have been reset and there are no output voltage signals present thereon. The electrical signal received from NOR gate 98 disables counter 92 and prevents any further "cut-out" delayed signals received from timer 84' from triggering any further counter 92 output signals to be applied as reset inputs to latch circuit 94.

The operation of the capacity controlling circuit 10' can now further be described with reference to FIGS. 4, 5 and 6. The graph of FIG. 6 depicts the system suction line refrigeration fluid pressure vs. time and is represented by pressure trace 121. The selected suction line "cut-in" pressure represented by line 120 is set for the system by potentiometer 75 (or possibly the "cut-in" comparator voltage from FIG. 3) as one input to the comparator 74, as hereinabove described. The selected "cut-out" pressure represented by line 130 is set by potentiometer 77 (or possibly the "cut-out" comparator voltage from FIG. 3) as one input to comparator 76, as hereinabove described). The desired system suction line pressure range $\Delta P$ has been selected for optimum efficiency of the system. The timer 82', as hereinabove described, establishes a predetermined delay time which is represented by the time interval $\Delta T$, and the delay time established by timer circuit 84' is represented by the shorter time interval $\Delta t$. Assuming that compressors 1 and 2 are operating in the system within the $\Delta P$ established by "cut-in" pressure (120) and the "cut-out" pressure (130), if the refrigerator load increases, then the suction line pressure will rise. If the load is heavy enough, the pressure (121) will rise until it exceeds the predetermined value established by potentiometer 75 (line 120) at point 122 and comparator 74 will generate an electrical "cut-in" signal to be applied to the timer 82.

The comparator signal output occurs at point 122 which is the point at which the suction line pressure 121 rises above or exceeds the predetermined cut-in system pressure and establishes the beginning of the delay time $\Delta T$ or timer 82'. The suction pressure may continue to rise as shown in FIG. 4 until timer 82' generates its delayed "cut-in" electrical control signal which is applied to counter 90, and since compressors 1 and 2 are already operating, counter 90 will generate an output signal at output 3 which is then applied through a conductor 95 as a "set" input to latch circuit 94. Receipt of the delayed "cut-in" signal from output 3 of timer 82' by the latch circuit 94 causes a positive voltage to appear at latch output 3 (conductor 60) which is applied to relay 48 for energizing the relay, closing relay switch 49 and "cutting-in" the third compressor 16', which has been "turned off" the longest time period. The end of the predetermined time delay, $\Delta T$, established by timer 82' occurs at point 124, and the third compressor or cooling stage now in the system adds cooling capacity and returns the pressure to the operating pressure differential $\Delta P$ range established by pressures 120 and 130. In the event that the combined operating capacity of compressors 12', 14' and 16' is still insufficient for the load, the suction pressure will not drop below the cut-in pressure (120) and cut-in timer 82' will generate another delayed "cut-in" signal to cut-in another compressor stage, up to the Nth stage to match the load demand.

In the event the suction pressure (121) declines because of over-capacity in the system, and falls below the predetermined "cut-out" pressure represented by line 130, then comparator 76 will generate a "cut-out" signal applied to the timer 84' occurring at point 126, which begins the established time delay $\Delta t$. When the predetermined time delay $\Delta t$ has elapsed, timer 84' generates a "cut-out" electrical control signal applied through conductor 88 as an input to the counter 92. The counter 92, in response to the received signal, will generate an output signal on line 1 applied through a conductor 93 to latch circuit 94 as a "reset" input. The counter reset signal applied to latch circuit 94 will "reset" output line 1 of the latch circuit, thereby removing the positive voltage output at conductor 56 and de-energizing relay 44', opening switch contacts 45 and "cutting-out" compressor 12' (which has been operating the longest time period) from the system, as reflected at 128, the end of the delay $\Delta t$ and the point where the suction pressure again begins to increase. When compressor 12' is "cut-out" of the system, the suction line pressure begins to increase until it returns to the desired operating range between the pressure differentials 120 and 130. Similarly, in the event that the combined operating capacity of the compressors or cooling stages still exceeds the load, another "cut-out" signal will be generated by timer 84' to "cut-out" another compressor stage until the operating stage capacity matches the system load.

In this way the multiple staged compressors can be "cut-in" or "cut-out" of the system to increase or decrease refrigeration capacity depending on the system refrigeration load by a discrete combination of compressor stages, thus matching as closely as possible the available compressor stage capacity with the system load. The sequence in which the compressors of the system are energized (cut-in) or de-energized (cut-out) ensures that the longest will always be the first to be "cut-out" when the system capacity needs to be diminished, and the compressor that has not operated the longest will be the next to be "cut-in" when the system capacity needs to be increased. In a system having "N" compressors, the sequence of energizing and de-energizing the compressors described above permits at least "N" incremental system capacity changes between successive energizations of any one compressor thereby permitting the system to change system capacity more often than changes are made in the energization state for any one of the "N" compressors in the system. Thus, this sequence of energizing and de-energizing the compressors provides combinations of energized compressors that exceed in number the number of compressors in the system.

The timers 82' and 84' and counters 90 and 92 "remember" the length of their respective time delays, $\Delta T$ and $\Delta t$. For example, referring to FIGS. 4, 5, and 6, if $\Delta T$ is five (5) minutes, and $\Delta t$ is five (5) seconds, if suction pressure 121 rises above the "cut-in" pressure (120) at point 122, the five (5) minute $\Delta T$ periods begins. However, if suction pressure trace 121 had dropped back below "cut-in" pressure 120 after only two (2) minutes had elapsed (or before reaching point 124), the "cut-in" signal from comparator 74 will cease, disabling timer 82'. Similarly, if suction pressure trace 121 falls below the "cut-out" pressure 130 as at point 126, the five (5) second $\Delta t$ period begins. However, if the suction pressure (121) increases and rises above "cut-out" pressure (130) after only three (3) seconds, the "cut-out" signal from comparator 76 will cease and disable timer 84', and no delayed "cut-out" signal will be sent to counter 92. Accordingly, no delayed "cut-in" signal will be addressed to counter 90. Therefore, no additional compressor or cooling stage will be "cut-in", but the next time the suction pressure 121 exceeds the "cut-in" pressure, timer 82' will again be energized and will produce a delayed "cut-in" signal after only three (3) minutes (the balance of $\Delta T$ left over from the last $\Delta T$ period) and "cut-in" or turn on the next compressor or cooling stage of the system. Similarly, the next time the pressure trace 121 decreases to fall below the "cut-out" pressure, timer 84' will again be enabled and will produce a delayed "cut-out" signal after only two (2) seconds (the balance of $\Delta t$ left over from the last $\Delta t$ period) and "cut-out" or turn off the compressor which has run the longest.

As above described, it will be evident that controller circuit 10' will "cut-in" or "cut-out" the next compressor or compressor stage as above described until the combination of stages has an operating capacity closest to matching the system load, i.e., causing the system suction pressure to return to the previously established $\Delta P$ range as hereinabove described and shown in FIG. 6. For example, if the compressor 12', 14' and 16' are the only compressors in the system, then the capacity controller 10' will select and provide increased or decreased compressor capacity in combinations to most closely match the load demand. The various combinations of compressors 12', 14' and 16' will be 12' alone, 12'-14', 12'-14'-16', 12'-16', 14'-16', 14' alone or 16' alone.

Similarly, if the compressors 12', 14' and 16' are unequal in capacity, and rated at 1, 2 and 4 horsepower (HP), respectively, then it has been found that the capacity controller 36 will select and provide increased or decreased compressor horsepower capacity in discrete increments or combinations to match the load demand. Assuming the above-described ratings of 1, 2 and 4 HP for compressors 12', 14' and 16', then the various possible combinations of those compressors will provide capacities of 1, 2, 3, 4, 5, 6, and 7 HP in response to changing load demand. The number of combinations for multiple compressors whether of equal or unequal capacity will always be lager than the number of compressors or compressor stages in the system. It will be further evident from the above-described operation and drawings showing multiple compressors 12', 14', 16', and 18' (1, 2, 3 to N number of compressors) that any number of parallel compressors can be controlled, such as a system of two (compressors 12' and 14'), a system of three (compressors 12', 14' and 16') or a system of N number (compressors 12', 14' and 16'-N).

The refrigeration capacity control invention herein disclosed may also be utilized in controlling multiple stage refrigeration of cooling systems having multicylinder compressors that are staged by controlling the compression of a plurality of compressor cylinders using conventional control valves by having controller 36 outputs control the utilization of the cooling stages by controlling the cylinders used by the compressors in the system. In addition, it is important to understand that while the system above-described in FIGS. 4, 5, 6 and 7 uses a separate time delay after determination of the reaching of the established "cut-in" or "cut-out" pressures (temperatures), only a single time delay is necessary to enable selection of successive cooling stages utilizing a single selected "cut-in" system pressure and a single selected "cut-out" system pressure. For instance, in FIG. 5, the output of "cut-out" comparator 76 could be applied to timer 82' and utilize a single delay time for both "cut-in" and "cut-out" determinations. Further, the $\Delta P$ differential between "cut-in" pressure 120 and "cut-out" pressure 130 (FIG. 6) may be large or small, depending on the system design and the best system operating pressure. In certain systems, the $\Delta P$ could be set at zero, with the "cut-in" and "cut-out" pressures being established at the same value.

Turning now to FIG. 1 a multiple compressor, multiple evaporator coil cooling or refrigeration system suitable for operation in conjunction with the present invention is illustrated. The multiple compressor system of FIG. 1 can also be operated in accordance with the above-described principles of system compressor pressure control.

As shown in FIG. 1, a plurality of parallel-staged refrigerant compressors 10, 12 and 14 are each separately connected for discharging compressed pressurized refrigerant vapor through common discharge line 16 to a condenser coil 18. The pressurized refrigerant vapor is condensed to a liquid in condenser coil 18 and delivered to a receiving vessel 20. From this receiving vessel 20, the liquid refrigerant flows through a common line 22 and then through line 24 to an expansion device or valve 26 for operation in conjunction with a first evaporator coil 27. The liquid refrigerant also flows from common line 22 through line 23 to an expansion device or valve 25 for operation in conjunction with a second evaporator coil 29.

The liquid refrigerant is injected through the respective expansion valves 26 and 25 into their respective evaporator coils 27 and 29, where the liquid refrigerant, encountering the low pressure of the evaporator coils, boils and evaporates, thus absorbing heat from the coils and cooling the surrounding respective areas 30 and 31.

The outputs of evaporator coils 27 and 29 are connected together and to common suction line 34. The vaporized refrigerant from the evaporator coils is drawn through suction line 34 where it is then delivered to the respective inlet ports of multiple compressors 10, 12 and 14. The pressure transducer 40' described with respect to the multiple compressor, single evaporator coil system shown in FIG. 4, is shown in FIG. 1 coupled to suction line 34 for measuring the suction line pressure, i.e., the compressor pressure operation.

Although it is beneficial to use the inventive optimizing temperature control apparatus hereinafter described more in detail with a simplified system using only a single compressor, it is also desirably used in conjunction with the illustrated multiple compressor system for cumulative results therewith. That is, the substantial advantages of the multiple compressor system operated in accordance with the above-described compressor pressure control operation are further enhanced by optimizing in a refrigeration system having multiple evaporator coils the compressor pressure control range (see FIG. 6) or the temperature control range (see FIG. 7) to achieve the minimum system compressor capacity required to maintain the desired temperature of the coldest compartment to be cooled.

The compressors shown in FIG. 1 may be cycled using suitable cut-in and cut-out control signals developed by potentiometer 75 and 77, respectively, in the manner above described. That is, the desired cut-in pressure or temperature is set by potentiometer 75 and compared in comparator 74 to the actual measured suction line pressure from pressure transducer 40' temperature from temperature sensor 44. If the measured system parameter exceeds the setting, a cut-in signal is generated to timer 82'. Similarly, potentiometer 77 sets the cut-out parameter and when the measured parameter is less than the cut-out parameter, a cut-out signal is generated to timer 84'.

In accordance with the present invention, a circuit is disclosed for optimizing system operation in a cooling system having multiple compressors and multiple evaporator coils either to obtain the highest possible suction line pressure, i.e., the lowest compressor capacity, that will satisfy the lowest desired temperature required by any of the evaporator coils, or to obtain control of the coldest compartment to be cooled to a desired temperature. The determination as to which system parameter the suction line pressure or the temperature of the coldest compartment to be cooled that will be used to control selection of compressor capacity depends on the selection of selector switch 105 shown in FIGS. 3 and 5.

A thermoelectric probe or sensing device 44 is positioned with respect to the evaporator coil or the area served by the evaporator coil that operates at the lowest temperature to generate an output voltage representative of the temperature in such compartment. In FIG. 1, it is assumed that coil 27, or area 30, is operated at a temperature lower than coil 29, or area 31. Devices known as thermocouples are well known examples of suitable thermoelectric probes.

For simplicity, area 32 is assumed to be warmer than area 30 even though substantially identical coils 27 and 29 are shown in FIG. 1. In an actual system, the maintaining of coil 29 warmer with respect to coil 27 is usually accomplished by the presence of an evaporator pressure regulator valve 31 in the warmer of the two coils. Such a valve 31 effectively restricts the line opening and raises the pressure, and hence the temperature, in coil 29 vis-a-vis the temperature of coil 27. A suitable thermocouple is used as the temperature sensing element 44 for sensing the temperature of the coldest area to be maintained. Similar temperature sensing element, such as temperature probe 41, may also be placed in each of the areas cooled.

In addition to whatever other initiating signals are produced by compressor controlled circuit 36, the signal produced by temperature sensor 44 is also used as an additional control signal, which can be better understood by reference to FIGS. 2 and 3. Referring to FIGS. 2 and 3, a voltage set point device 46 establishes a reference voltage output which is equal in value to the output from temperature sensor 44 when the monitored coil or area is at the desired norm temperature. The outputs from temperature sensor 44 and from voltage set points 46 and then connected as the respective inputs to an integrator 48.

Integrator 48 is a comparison type of adjustment means that produces an integrated output voltage dependent on the difference in the applied inputs. Whenever the output from temperature sensor 44 indicates that the monitored conditions in the area 30 are warmer than the reference setting, then an adjustment output voltage is produced on the output of integrator 48 for reducing the suction line pressure and hence the temperature being monitored. On the other hand, whenever the output from temperature sensor 44 indicates that the monitored conditions are colder than the reference, then an adjustment output voltage is produced for increasing the suction line pressure and raising the temperature being monitored. The output of integrator 48 is an integrated voltage, either positive or negative depending on which of the two input voltages is positive with respect to the other.

In accordance with operation well-known in the art, defrosters 28 and 40, respectively, are operated in suitable fashion for defrosting, respectively, coils 27 and 29. A defrost control 42, which may include a timer or frost sensor or similar device, activates and deactivates the respective defrosters. When defroster 28 is operated by defrost control 42, a signal is also produced for operating switch 47 to short together the inputs to integrator 48. This assures that there is no further change in the output from integrator 48 during this time. When the defrost cycle is over and defroster 28 is deactivated, then switch 47 is allowed to open to place the circuit in operation to continue as before.

It is well known by those skilled in the art that an integrator is an analog memory device, it remembers what has happened in the past. If the input voltage to be integrated is zero volts, there will be no change in the integrator output voltage. That is, whatever voltage is on the output of the integrator, that voltage will remain unchanged as long as there is no further voltage to be integrated. Further, the rate at which an integrator changes its output voltage is dependent upon the magnitude of the voltage to be integrated. Thus, when the defrost lockout switch 47 is closed, there will be no further change in the signal at the output of the integrator 48. Similarly, when defrost lockout switch 47 is open, the magnitude of the difference between the voltage generated by the temperature probe 44 and the voltage set point 46, i.e., the norm temperature desired for area 30, will determine the rate at which the output from integrator 48 changes and by how much.

In accordance with the present invention, this integrated comparison between the measured temperature of area 30 and the desired norm temperature for that area is used to dynamically control either the compressor pressure operation to optimize the operating suction line pressure at the highest pressure that will maintain the cooling in the coldest compartment (switch 105 selecting pressure transducer 40'), or the temperature of the coldest compartment (switch 105 selecting the output from temperature sensor 44). As described above with respect to the multiple compressor refrigeration system shown in FIGS. 4, 5, 6 and 7 the compressor control circuit 10' (compressor control circuit 36 of the system of FIG. 1) produces a fixed "cut-in" and fixed "cut-out" suction line operating pressure (see, for example, FIG. 6). (As above discussed, the temperature of the coldest compartment to be cooled could just as well be used (see FIG. 7).) The pressure of the suction line is monitored and compared to these two reference pressure settings by comparators 74 and 76, respectively, to produce control signals to adjust the compressor capacity to effect control of the suction line pressure to an average value between the cut-in and cut-out pressure settings.

Now turning to FIG. 3, there is shown a circuit responsive to the temperature in the coldest compartment to be maintained, for generating cut-in and cut-out voltages for use in conjunction with the comparators 74 and 76 shown and described with respect to FIG. 5. In other words, the circuit of FIG. 3 produces a cut-in and cut-out voltage as a function of the difference between the actual and the desired temperature in area 30 to respectively replace the voltages generated by potentiometers 75 and 77 in the control circuit shown in FIG. 5. In this manner, the two fixed voltages, the cut-in and cut-out pressures, normally generated by potentiometers 75 and 77, are now adjustable in response to the integrated difference between the desired and the actual temperature in the coldest compartment to be cooled.

As previously described, the integrator 48 acts as a memory device, it remembers what has happened in the past. If the compartment 30 temperature is below the desired norm, the inegrator 48 will increase its output voltage at a rate controlled by the temperature difference, i.e., the voltage difference. A greater difference produces a faster change. This increased voltage increases both the cut-in and cut-out voltages to the comparators 74 and 76. These increased pressure limits result in an increase in the average controlled suction line pressure for the case where switch 105 has selected the suction line pressure transducer 40' as the input to comparators 74 and 76.

The rate at which this suction line pressure seeks out the new higher pressure is controlled in part by the difference between the desired and the actual temperatures in the coldest compartment. An increased suction line pressure results in less cooling from coil 27 and a warming of area 30. When the temperature in area 30 reaches the desired setting, there will no longer by any voltage into integrator 48, and the integrator output signal will stabilize at a higher than previous value. This integrator process eventually results in an optimum suction line pressure operating condition, i.e., the highest suction line operating pressure possible to satisfy the cooling demands of the coldest compartment. A higher suction line pressure equates directly to a lower compressor capacity requirement which, in turn, produces a reduction in power consumption to run the refrigeration system. A similar operation occurs when switch 105 selects the output from temperature sensor 44 as the input to comparators 74 and 76.

Referring now to the circuit shown in FIG. 3, the output signal from integrator 48 is shown coupled through a forward conducting diode 87 into a voltage setting network of resistors 86 and 89 operating in combination with a pair of Zener diodes 82 and 84 connected in series arrangement. The Zener diode arrangement of diodes 82 and 84 is connected across the potentiometer 86 thereby to set a constant voltage drop thereacross. The voltage from the high side of the potentiometer 86 is the control voltage for the CUT-IN COMPARATOR while the wiper voltage of potentiometer 86 is the control voltage for the CUT-OUT COMPARATOR. The low side of the potentiometer is connected to circuit ground through an appropriate resistor 89. Because of the voltage divider effect of the variable potentiometer 86 and the constant voltage drop of Zener diodes 82 and 84 thereacross, the voltage of the CUT-OUT COMPARATOR signal will always differ by a constant value from the voltage of the CUT-IN COMPARATOR signal.

Still referring to FIG. 3, also connected to the junction of diodes 87 and 82 is a variable set voltage generated from the wiper output of a variable potentiometer 80 whose high side is connected to a fixed voltage +V and its low side connected to circuit ground. The setting of potentiometer 80 is used to set a minimum voltage for the signal CUT-IN COMPARATOR and CUT-OUT COMPARATOR when the voltage from integrator 48 is at zero volts or below. It will be obvious to a person of ordinary skill in the art from this disclosure of the circuits of FIGS. 2 and 3 that potentiometer 80 and diode 87 are not required. The voltage set point 46 adjustment would work equally well, the resulting circuit just would not have a minimum CUT-IN COMPARATOR and CUT-OUT COMPARATOR voltage setting.

The voltage CUT-IN COMPARATOR will be controlled by the summation of the voltage from potentiometer 80 and the output of integrator 48 applied to the summing junction through diode 87. Thus, as the output of integrator 48 increases, the cut-in and cut-out control voltages will likewise increase indicating that the normal operating system parameter selected to control compressor capacity will have to increase in order to bring the temperature of the coldest compartment back to the norm setting. Eventually, the control circuit 36 selects the appropriate compressor capacity to achieve the desired system operating parameter which will satisfy the cooling requirement of the coldest compartment. Because of the pressure regulator valves included in the evaporator coils of the other evaporator coils in the multiple evaporator coil system plus the fact that each of the other areas or compartments to be cooled by the other evaporator coils are at a warmer temperature, the resulting average suction line pressure will be adequate to achieve the desired cooling of those compartmentalized areas.

It has been discovered that operation of the current apparatus in conjunction with the apparatus disclosed in application Ser. No. 257,113 and discussed above achieves approximately a 20 percent reduction in energy consumption over the best known prior art system.

While a particular embodiment of the present invention has been shown and described, it will be understood that the invention is not limited thereto, since many modifications may be made and will become apparent to those skilled in the art. For example, the above system has described temperature operation in conjunction with one coil or area which is desirably operated colder than another coil or area. If desired, it is possible to utilize a thermoelectric sensing means in conjunction with both coils or areas in a two-coil or two-area system (probes 44 and 41 shown in FIG. 1). An average output or other suitable combined output or selection algorithm can then be employed as the variable or operating output to integrator 48 and to the selector switch 105. Additionally, rather than detect only suction line pressure and area temperatures as the system parameters for controlling compressor capacity, other system parameters may also be used, such as evaporator superheat, sump oil temperature, etc.

What is claimed is:

1. A method of controlling the capacity of a number of commonly piped compressors of equal capacity in a refrigeration system which includes an evaporator coil for cooling an area, comprising the steps of:
   (a) establishing an operation area temperature range having an upper limit and a lower limit;
   (b) detecting the temperature in the area for determining when said temperature exceeds said upper limit and when said temperature is below said lower limit;
   (c) generating an increase capacity signal when said operating area temperature exceeds said upper limit and a decrease capacity signal when said operating area temperature is below said lower limit; and
   (d) applying said increase capacity signal and said decrease capacity signal to respectively energize and deenergize said compressors in a sequence where the first deenergized compressor is the first to be energized and the first energized compressor is the first to be deenergized, said sequence permitting at least N incremental system capacity changes between successive energizations of any one of said compressors, where N is the number of compressors in the system, thereby
      (i) permitting the system to change system compressor capacity more often than changes are made in the energization state for any one of said compressors, and
      (ii) permitting the system to operate with an average area temperature within a narrow temperature control range to obtain an optimal operating efficiency for the system.

2. Apparatus for controlling the capacity of a number of commonly piped compressors of equal capacity in a refrigeration system to obtain an energy efficient system, which system includes an evaporator coil for cooling an area, comprising:
   (a) a temperature selecting means for establishing an operating area temperature range having an upper limit and a lower limit;
   (b) a detection means for sensing the area temperature and cooperating with said temperature selecting means for determining when said temperature exceeds said upper limit and providing an increase capacity signal in response thereto, and when said area temperature is below said lower limit and providing a decreased capacity signal in response thereto;
   (c) a sequencing means connected to said detection means for establishing a first-off first-on sequence for energizing the compressors in response to an increase capacity signal and for establishing a first-on first-off sequence for deenergizing the compressors in response to a decrease capacity signal; and
   (d) a control circuit means connected to said sequencing means for connecting energizing signal to said compressors in a first-on first-off sequence, said sequence permitting at least N incremental system capacity changes between successive energizations of any one of said compressors, where N is the number of compressors in the system, thereby
      (i) permitting the system to change system compressor capacity more often than changes are made in the energization state for any one of said compressors, and
      (ii) permitting the system to operate with an average area temperature within a narrow temperature control range to minimize energy consumption.

3. A method of controlling a compressor system having a number of commonly piped compressors of equal capacity, a common suction pressure load and an evaporator coil for cooling an area to obtain a desired average area temperature, comprising the steps of:
   (a) establishing an operation area temperature range having an upper limit and a lower limit;
   (b) detecting the area temperature and determining when said temperature exceeds said upper limit and when said temperature is below said lower limit;
   (c) providing an increase capacity signal when said area temperature exceeds said upper limit and a decrease capacity signal when said area temperature is below said lower limit; and
   (d) selectively energizing and deenergizing compressors in a sequence in response to the respective increase capacity signals and the decrease capacity signals to provide a combination of energized compressors that exceed in number the number of compressors in the system so that said evaporator coil cools said area, said sequence permitting at least N system capacity changes between successive energizations of any one of said compressors, where N is the number of compressors in the system, thereby
      (i) permitting the system to change system compressor capacity more often than changes are made in the energization state for any one of said compressors, and
      (ii) permitting said system to operate with an average area temperature within a narrow temperature control range and obtain an optimal operating efficiency for performance of the system.

4. Apparatus for controlling the capacity of a number of commonly piped compressors of unequal capacity having a common suction pressure load in a refrigeration system which includes an evaporator coil for cooling an area, comprising:
   (a) a temperature selecting means for establishing an operating area temperature range having an upper limit and a lower limit;
   (b) a detection means for sensing the area temperature and cooperating with said temperature selecting means for determining when said temperature exceeds said upper limit and providing an increase capacity signal in response thereto, and when said area temperature is below said lower limit and providing a decreased capacity signal in response thereto; and
   (c) a selection means for receiving said increase capacity signals and said decrease capacity signals and in respective response thereto selectively energizing and deenergizing said compressors in a sequence to provide combinations of energized compressors that exceed in number the number of compressors in the system so that said evaporator coil cools said area to obtain a desired average temperature.

5. The method as described in claims 1 or 3 further including the step of providing a time delay prior to energizing or de-energizing a subsequent compressor in the system.

6. The apparatus as described in either claim 2 or 4, wherein said temperature selecting means comprises:

(a) a voltage source; and
(b) at least one variable resistance means connected to said voltage source for supplying a voltage signal representative of each of said operating area temperature range limits.

7. The apparatus as described in claim 6, wherein said detection means comprises:
(a) a temperature transducer for measuring said area temperature and generating an electrical signal representative of the measured temperature; and
(b) a comparator circuit receiving said voltage signals representative of said operating area temperature range limits and said transducer signal for comparing said transducer signal with said temperature limit voltage signals for determining when said transducer signal is greater than or less than said operating area temperature range limits and generating cut-in and cut-out output signals in response thereto.

8. The apparatus as described in claim 7, wherein said sequencing means comprises counting means receiving said cut-in or cut-out output signals from said detection means and generating in response to each of said received signals a cut-in or cut-out control signal, said cut-in control signals occurring in a first-off first-on sequence and said cut-out control signals occurring in a first-on first-off sequence.

9. The apparatus as described in claim 8, wherein said control circuit means comprises:
(a) a circuit means receiving each of said cut-in control signals and generating in response thereto a turn-on-signal for energizing a parallel compressor, said circuit means further receiving each of said cut-out control signals and generating in response thereto a turn-off signal for de-energizing a parallel compressor; and
(b) a relay means cooperating with each of the compressors for receiving said turn-on and turn-off signals from said circuit means and energizing or de-energizing the corresponding parallel compressor in response thereto.

10. The apparatus as described in either claims 2 or 4 further including time delay means for providing a time delay prior to energizing or de-energizing a subsequent compressor in the system.

11. The apparatus as described in claim 10, wherein said time delay means comprises a timing circuit for receiving said cut-in and cut-out output signals from said detection means and in response thereto generating delayed cut-in or cut-out output signals applied to said sequencing means.

* * * * *